United States Patent [19]

Mathis, et al

[11] 4,421,910

[45] Dec. 20, 1983

[54] POLYMER STABILIZATION

[75] Inventor: Jerry O. Reed; Ronald D. Mathis, both of Bartlesville, Okla.

[73] Assignee: Phillips Petroleum Company, Bartlesville, Okla.

[21] Appl. No.: 423,386

[22] Filed: Sep. 24, 1982

[51] Int. Cl.$^3$ ............................................. C08G 75/14
[52] U.S. Cl. .................................... 528/388; 525/537
[58] Field of Search ......................... 528/388; 525/537

[56] References Cited

U.S. PATENT DOCUMENTS

| | | | |
|---|---|---|---|
| 3,293,208 | 12/1966 | Milionis et al. | 260/45.75 |
| 3,325,444 | 6/1967 | Best et al. | 260/45.7 |
| 3,658,753 | 4/1972 | Reed et al. | 60/45.7 P |
| 3,755,396 | 8/1973 | Brooks | 260/439 R |
| 3,812,080 | 5/1974 | Feldman | 260/45.75 R |

*Primary Examiner*—Melvyn I. Marquis

[57] ABSTRACT

The curing of arylene sulfide polymers is accelerated by the addition of an effective amount of at least one metal salt of dihydrocarbyldithiophosphinic acid.

14 Claims, No Drawings

POLYMER STABILIZATION

FIELD OF THE INVENTION

This invention relates to improving the characteristics of arylene sulfide polymer compositions. In one aspect, this invention relates to the use of cure promoters in poly(arylene sulfide) polymer compositions. In another aspect, this invention relates to the use of cure promoters in poly(arylene sulfide) polymer compositions to enhance cross-linking or substantial alteration of physical properties during heating. In accordance with a further aspect, this invention relates to the use of metal salts of dihydrocarbyldithiophosphinic acid as curing agents for arylene sulfide polymers, e.g., poly(phenylene sulfide), the resulting polymer products, and to a process for enhancing the cure of such polymers.

BACKGROUND OF THE INVENTION

In the production of arylene sulfide polymers, it is sometime desirable that the melt flow and molecular weight of the polymer be changed during processing of the polymer. Various procedures have been utilized to cause arylene sulfide polymers to change in physical properties during processing. It is well known that arylene sulfide polymers can be treated in a manner such that the polymer properties substantially change during heating of the polymer by incorporating into the polymer a curing promoter. A new group of curing agents has now been discovered.

Accordingly, an object of this invention is to provide a process for promoting the curing of arylene sulfide polymers.

A further object of this invention is to provide cured arylene sulfide polymers.

Another object of this invention is to provide effective curing agents for poly(phenylene sulfide).

Other objects, aspects, and the several advantages of the invention will be apparent to those skilled in the art upon a study of the specification and the appended claims.

SUMMARY OF THE INVENTION

According to the invention, the curing of arylene sulfide polymers, exhibited as increased melt viscosity, is accelerated by the addition of a finite, but small effective amount of at least one metal salt of dihydrocarbyldithiophosphinic acid which promotes crosslinking of the polymer during heating.

In another embodiment of the invention, the curing of poly(phenylene sulfide) polymer during heating is promoted by the addition of a metal dihydrocarbyldithio phosphinate.

In a specific embodiment of the invention, an arylene sulfide polymer, e.g., poly(phenylene sulfide) is heated in the pressure of a finite, but small effective amount, sufficient to enhance curing (based on the storage modulus results obtained with a Rheometric Dynamic Spectrometer) of the polymer of at least one metal dihydrocarbyldithiophosphinate, particularly cobalt and zinc dicyclohexyldithiophosphinates.

DESCRIPTION OF THE PREFERRED EMBODIMENTS

The invention is applicable for use with any normally solid, heat curable, high molecular weight arylene sulfide polymer. Arylene sulfide polymers which can be employed in the process of this invention include arylene sulfide polymers which have a melt flow of at least about 10 and generally within the range of about 20 to about 400 and higher (determined by the method of ASTM D 1238-70, modified to a temperature of 316° C. and using a 5-kg weight, the value being expressed as g/10 min.). Thus, the arylene sulfide polymers can be linear, branched or lightly cross-linked. The preferred arylene sulfide polymer is a linear poly(p-phenylene sulfide) (PPS) having a melting or softening point of at least 150° C., preferably 230° C. to 330° C. Although the method by which the polymers of this description are produced is not critical, preferably the polymer employed in the process is prepared by use of polyhaloaromatic compounds, alkali metal sulfides, and organic amides. For example, the arylene sulfide polymers for use in this invention can be produced by the method of U.S. Pat. No. 3,354,129, which is hereby incorporated by reference. Alternatively, and presently preferred, the polymer employed can be prepared by use of a p-dihalobenzene, an alkali metal sulfide, an organic amide, and an alkali metal carboxylate as in U.S. Pat. No. 3,919,177, optionally, together with an alkali metal hydroxide such as sodium hydroxide. The disclosure of U.S. Pat. No. 3,919,177 is hereby incorporated by reference.

The metal salts of dihydrocarbyldithiophosphinic acid used as curing promoters according to the invention have the general formula

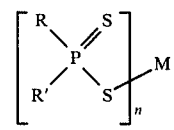

where M is a metal selected from among copper, zinc, chromium, manganese, cobalt and nickel, n is the valence of M and is generally 2, and R, R' are the same or different hydrocarbon (hydrocarbyl) radicals containing from 1 to about 20 carbon atoms, preferably from about 4 to about 12 carbon atoms, selected from among alkyl, cycloalkyl, aryl and combinations thereof such as alkaryl. Cycloalkyl radicals are presently preferred.

Exemplary compounds include:
copper(II) dimethyldithiophosphinate
copper(II) n-butyl-isobutyldithiophosphinate
zinc dicyclohexyldithiophosphinate
zinc dicycloheptyldithiophosphinate
zinc di-n-dodecyldithiophosphinate
chromium(II) diphenyldithiophosphinate
manganese(II) di-n-eicosyldithiophosphinate
cobalt dicyclohexyldithiophosphinate
cobalt dicyclooctyldithiophosphinate
nickel(II) dibenzyldithiophosphinate and the like and
   mixtures.

Zinc and cobalt dicyclohexyldithiophosphinates are presently preferred.

The amount of curing promoter incorporated into the arylene sulfide polymer will be a finite, effective amount sufficient to accelerate curing of the polymer. In general, the curing agent additives of this invention are employed in an amount within the range of about 0.2 to about 5, preferably about 0.5 to 2 weight percent based on the weight of the arylene sulfide polymer.

In addition to the curing agent additives of this invention, the compositions can contain other ingredients conventionally employed in arylene sulfide polymer compositions. For instance, fillers such as titanium dioxide, calcium carbonate, aluminum oxide, aluminum silicate, ferric oxide, silicon dioxide, asbestos fibers, glass fibers, and poly(tetrafluoroethylene), pigments, resins, and/or plasticizers, and the like can be present.

The cure promoter can be incorporated into the arylene sulfide polymer at any stage of processing, preferably prior to being subjected to elevated temperature. In one practical application of the invention, the cure promoters are incorporated into the arylene sulfide polymer, such as a poly(phenylene sulfide) polymer, prior to forming articles by injection molding.

The processes of this invention of incorporating the cure promoters into the polymer can be conducted batch-wise or continuously.

The following examples are intended to illustrate the compositions and process of the invention.

EXAMPLE

Sample Preparation And Test Method

A series of samples was prepared by mixing individual portions of a linear poly(p-phenylene sulfide), abbreviated PPS, with a specified metal dihydrocarbyldithiophosphinate, when employed. The PPS was produced in the manner described in U.S. Pat. No. 3,919,177. The recovered polymer was in the form of a powder (fluff) having a melt flow of 250 g/10 minutes as determined in accordance with ASTM D 1238-70, modified to a temperature of 316° C. and using a 5 kg weight.

Generally, 15 g of the PPS powder was admixed with about 50 mL of an acetone solution containing 0.15 g of the metal dihydrocarbyldithiophosphinate. The solvent was removed by evaporation over a suitable period of time at ambient conditions, e.g. overnight or longer, if needed, in a laboratory fume hood. The dried powders were stirred and additionally dried in a vacuum oven at room temperature (about 23° C.) for approximately 2 hours.

Discs measuring 1×0.25 inches (2.54×0.64 cm) were compression molded from about 2.5 g of each mixture at room temperature by employing a mold and a laboratory press using a platen pressure of about 10,000 psig (69 MPa). Each cold molded disc was subsequently compression molded into test buttons measuring about 1×0.1875 inches (2.54×0.48 cm) at 325° C. The molding cycle typically comprised 2½ minutes at a platen pressure of about 5,000–10,000 psig (34–69 MPa) and 2½ minutes at a platen pressure of about 30,000 psig (207 MPa). While maintaining the latter pressure, heating was discontinued and cooling started by circulating tap water through the platens. When the mold temperature reached about 121° C., the pressure was released and the test button was removed from the mold.

Each test button was evaluated for changes in degree of crosslinking or melt viscosity in a test employing a Rheometric Dynamic Spectrometer. The test, which is useful in measuring the thermal stability of a sample, determines storage modulus of a sample as a function of time at a constant shear of 10 radians per second at 300° C.

The metal dihydrocarbyldithiophosphinates employed as additives in PPS and the test results obtained are given in the following Table.

| | | | Influence Of Selected Metal Dihydrocarbyldithiophosphinates On Storage Modulus | | | | |
|---|---|---|---|---|---|---|---|
| Run No. | Metal Salt | Melt Flow g/10 min | Storage Modulus (SM), Dynes/Cm$^2$ At Time | | | Dynes/cm$^2$ SM$_{20}$–SM$_6$ | SM$_{20}$–SM$_6$ Percent[c] Change |
| | | | 2 min | 6 min | 20 min | | |
| 1 | None (Control) | 253 | 1020 | 1140 | 2340 | 1200 | 105 |
| 2 | CDP[a] | 340 | 1510 | 1990 | 7780 | 5790 | 291 |
| 3 | ZDP[b] | 250 | 1350 | 1830 | 6450 | 4620 | 252 |

[a]cobalt dicyclohexyldithiophosphinate
[b]zinc dicyclohexyldithiophosphinate
[c]determined from the expression $\frac{SM_{20} - SM_6}{SM_6} \times 100$ The above results indicate that both CDP and ZDP initially decrease the melt viscosity of PPS based on the melt flow test at 316° C. as shown by the greater values for invention runs 2 and 3. Little or no mixing occurs in the melt flow test because of its nature. However, under dynamic conditions such as those imposed in the RDS test, it is apparent that much different results are obtained with cobalt and zinc diclohexyldithiophosphinates since after 2 minutes into the test their storage modulus values are about 1.5 times and about 1.3 times greater, respectively, than that of the control. As the test progresses to 20 minutes the disparity between the control and invention runs becomes even greater, e.g. the cobalt salt-containing sample has a storage modulus value about 2.8 times greater than the control and the zinc salt-containing sample has a storage modulus value about 2.4 times greater than, the control. Since melt viscosity (degree of crosslinking) is directly proportional to storage modulus it is clear that the cobalt and zinc salts are acting as cure promoters for PPS as compared to the control in view of their substantially greater storage modulus values which accelerate throughout the length of the test.

We claim:

1. A polymer composition exhibiting increase melt viscosity when subjected to heat comprising a poly(arylene sulfide) polymer containing a finite, but small effective amount, sufficient to promote polymer curing and cross-linking of at least one metal salt of dihydrocarbyl dithiophosphinic acid.

2. A composition according to claim 1 wherein said metal salt has the formula

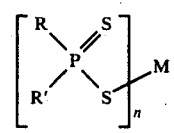

where M is a metal selected from among copper, zinc, chromium, manganese, cobalt and nickel, n is the valence of M, and R, R' are the same or different hydrocarbyl radicals containing from 1 to about 20 carbon atoms, preferably from about 4 to about 12 carbon atoms, selected from among alkyl, cycloalkyl, aryl and combinations thereof such as alkaryl.

3. A composition according to claim 2 wherein said salt is cobalt or zinc dicyclohexyldithiophosphinate.

4. An article of manufacture formed from the composition of claim 1.

5. A molded article formed from the composition of claim 1.

6. A composition according to claim 1 wherein the amount of metal salt present ranges from about 0.2 to about 5 weight percent based on the weight of said polymer.

7. A composition according to claim 6 wherein said polymer is poly(p-phenylene sulfide) having a melt flow of about 20 to about 400.

8. A composition according to claim 1 wherein said polymer is poly(p-phenylene sulfide) and said metal salt is cobalt or zinc dicyclohexyldithiophosphinate.

9. A method for increasing the melt viscosity of poly(arylene sulfide) polymers which comprises incorporating therein an effective amount of at least one metal salt of dihydrocarbyldithiophosphinic acid which amount is sufficient to promote curing and cross-linking of said polymer during heating.

10. A method according to claim 9 wherein the amount of said metal salt ranges from about 0.2 to about 5 weight percent based on the weight of said polymer.

11. A process according to claim 9 wherein said arylene sulfide polymer is poly(p-phenylene sulfide).

12. A method according to claim 9 wherein said metal salt has the formula

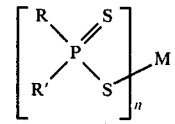

where M is a metal selected from among copper, zinc, chromium, manganese, cobalt and nickel, n is the valence of M, and R, R' are the same or different hydrocarbyl radicals containing from 1 to about 20 carbon atoms.

13. A method according to claim 9 wherein said polymer is poly(p-phenylene sulfide) and said metal salt is cobalt or zinc dicyclohexyldithiophosphinate.

14. A method according to claim 9 wherein said polymer is poly(p-phenylene sulfide) having a melt flow of about 20 to about 400.

* * * * *